(12) United States Patent
Niiyama et al.

(10) Patent No.: US 7,382,430 B2
(45) Date of Patent: Jun. 3, 2008

(54) LIQUID CRYSTAL OPTICAL ELEMENT AND TEST METHOD FOR ITS BOUNDARY LAYER

(75) Inventors: Satoshi Niiyama, Kanagawa (JP); Noriko Suehiro, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/681,247

(22) Filed: Mar. 2, 2007

(65) Prior Publication Data

US 2007/0146562 A1    Jun. 28, 2007

Related U.S. Application Data

(63) Continuation of application No. 10/448,142, filed on May 30, 2003, now abandoned, which is a continuation of application No. 09/847,333, filed on May 3, 2001, now Pat. No. 6,674,494.

(30) Foreign Application Priority Data

Dec. 28, 2000    (JP) .............................. 2000-402045

(51) Int. Cl.
    *G02F 1/1333*    (2006.01)
(52) U.S. Cl. ...................... 349/138; 349/123; 349/35
(58) Field of Classification Search ................ 349/138, 349/123, 135, 179, 177, 185–187, 35, 106, 349/169, 175
See application file for complete search history.

(56) References Cited

U.S. PATENT DOCUMENTS

| | | | |
|---|---|---|---|
| 5,078,475 A | 1/1992 | Sekimura et al. | |
| 5,235,445 A | 8/1993 | Hirai et al. | |
| 5,312,868 A | 5/1994 | Abe et al. | |
| 5,874,041 A | 2/1999 | Matsumura et al. | |
| 5,889,566 A | 3/1999 | Wu et al. | |
| 5,936,691 A | 8/1999 | Kumar et al. | |
| 6,072,558 A | 6/2000 | Tanaka et al. | |
| 6,233,027 B1 | 5/2001 | Unno et al. | |

(Continued)

FOREIGN PATENT DOCUMENTS

| | | | |
|---|---|---|---|
| JP | 57-078518 | | 5/1982 |
| JP | 62-123425 | | 6/1987 |
| JP | 03-107925 | | 5/1991 |
| JP | 05-196925 | | 8/1993 |
| JP | 07-104297 | | 4/1995 |
| JP | 08-114803 | | 5/1996 |
| JP | 08-220326 | * | 8/1996 |
| JP | 11-167126 | | 6/1999 |
| JP | 11-288008 | | 10/1999 |

OTHER PUBLICATIONS

U.S. Appl. No. 11/681,247, filed Mar. 2, 2007, Niiyama et al.

*Primary Examiner*—Thoi V Duong
(74) *Attorney, Agent, or Firm*—Oblon, Spivak, McClelland, Maier & Neustadt, P.C.

(57) ABSTRACT

On substrates 2a, 2b of a chiral nematic liquid crystal optical element 1, transparent electrodes 3a, 3b and electrical insulation layers 4a, 4b are formed, and further resin layers 5a, 5b having a pencil hardness of "B" or less are formed on the electrical insulation layers by a spin coating method so as to be in contact with a liquid crystal layer 7. When the surface hardness of the resin layers is to be measured, a glass substrate on which a resin layer is formed by screen-printing is prepared as a test piece, and the test piece is fitted to a pencil-scratching tester. The surface hardness is measured by scratching the test piece with two kinds of testing pencil selected from testing pencils having 17 grades of density.

8 Claims, 3 Drawing Sheets

U.S. PATENT DOCUMENTS

| | | |
|---|---|---|
| 6,366,330 B1 | 4/2002 | Khan et al. |
| 6,532,048 B1 | 3/2003 | Matsui |
| 6,565,932 B2 * | 5/2003 | Iwamatsu et al. ............ 428/1.1 |
| 6,646,060 B1 | 11/2003 | Toyohara et al. |
| 6,674,494 B2 | 1/2004 | Niiyama et al. |
| 2001/0005246 A1 | 6/2001 | Taniguchi et al. |
| 2002/0126229 A1 | 9/2002 | Niiyama et al. |
| 2003/0193641 A1 | 10/2003 | Niiyama et al. |

* cited by examiner (a)　　　　　　　　　　　(b)

(a)  (b)

LIQUID CRYSTAL OPTICAL ELEMENT AND TEST METHOD FOR ITS BOUNDARY LAYER

CROSS-REFERENCE TO RELATED APPLICATIONS

The entire disclosure of Japanese Patent Application No. 2000-402045 filed on Dec. 28, 2000, including specification, claims, drawings and summary are incorporated herein by reference in their entirely.

BACKGROUND OF THE INVENTION

1. Field of the Invention

The present invention relates to a liquid crystal optical element provided with liquid crystal which exhibits two or more optically stable states in a non-voltage-application time.

2. Description of the Background

A chiral nematic liquid crystal optical element (hereinbelow, referred to as CL-LCD) has a phase-change type mode. It provides selective reflection in a planar state (hereinbelow, referred to as PL) and provides a scattering state in a focalconic state (hereinbelow, referred to as FC). By applying a predetermined voltage across the electrodes, the liquid crystal can be transformed into PL or FC. For example, when it is transformed from FC to PL, the liquid crystal is once rendered to be a homeotropic state (a state that liquid crystal molecules are aligned vertically to the substrate plane, and hereinbelow, referred to as HO), and then, it is transformed into PL. Then, the liquid crystal is stable in PL or FC even in a non-voltage-application time, and either state can be maintained.

Description will be made as to an optical display state. In FC, a slightly scattering state of incident light is produced, and in PL, a selective reflection of incident light is produced. Further, by adjusting the helical pitch ($\lambda_{AVG}$) of the liquid crystal layer, an operation mode of "transmittance-scattering" or a color display utilizing colors of selectively reflected light can be effected.

Electrodes for CL-LCD, and a display state of it and so on are described already in U.S. Ser. No. 09/813,988 (preliminary application No., filed on Mar. 22, 2001), and the relation of a driving method and a display state thereof and so on are described already in U.S. Patent Application filed on Apr. 2, 2001 by Makoto Nagai et al (no application number given yet). The present application refers to and includes portions relating to these applications.

Next, description will be made as to a unique problem of CL-LCD originated from a memory state. The state of CL-LCD is made to be a memory state in FC or PL, and it is left for a predetermined time in a non-voltage-application state. Then, even when a voltage corresponding to a new image is applied so as to change the display, a "image-sticking phenomenon" wherein the previous display remains takes place.

In the following, such image-sticking phenomenon will be explained by taking a dot matrix type CL-LCD having 160 row electrodes and 160 column electrodes as an example. In this case, it is assumed that "an alignment layer" in contact with the liquid crystal layer at an inner side of the substrates is made of the same material as used for a TN or STN liquid crystal display element. Generally, since a surface of an aligning layer in the TN or STN liquid crystal display element is subjected to an aligning treatment by rubbing, a material having a high surface hardness (for example, 3H-6H in a pencil hardness test method) is used. In CL-LCD too for example, the same technique is used. As a concrete example on an aligning layer in contact with the liquid crystal layer, there is known a case of providing polyimide or a case without using any aligning layer (U.S. Pat. No. 5,453,863).

Then, a background portion of a display area of dot matrix type is made to be FC, and portions corresponding to characters, figures and so on are made to be PL. An example of displaying a character of "A" is shown in FIG. 4(a). After such predetermined image has been provided, the application of a voltage is stopped, and the display panel is left for a long time in a incubator of 60° C.

Then, a voltage which makes the liquid crystal in the whole display area to be HO is applied. When the liquid crystal in the whole area becomes HO, the display in the whole area is extinguished. When a voltage is applied subsequently so that the liquid crystal in the whole area becomes FC, the whole area does not provide an uniform color but the character of "A" which has been previously displayed remains slightly, and the character is observed as shown in FIG. 4(b). Further, even in a case that the liquid crystal of the whole area is made to be PL via HO after the panel has been left for a long time, the display of "A" remains.

On the contrary, the image-sticking phenomenon takes place even in the following case. Namely, the liquid crystal in the background portion is made to be PL, and the liquid crystal in the portions corresponding to characters and so on is made to be FC. The display panel in such states is left for a long time, and then, a display in the whole area is extinguished by applying a voltage by which the state of the liquid crystal in the whole area of display becomes HO (the liquid crystal itself is in a transparent state). Subsequently, the whole display area is changed to PL or FC. In particular, the image-sticking phenomenon is apt to be observed in a case that a display state wherein the liquid crystal corresponding to the background portion is FC and the liquid crystal corresponding to characters and so on is PL is left for a long time, and then, the liquid crystal in the whole display area is made to be FC.

Further, image-sticking takes place as well in a case of CL-LCD having segment type electrodes. For instance, the image-sticking occurs when a display state wherein a display portion is PL and a background portion is FC is maintained for a long time, and then, such display is changed to another display.

In FIG. 5(a), all 7 segments are ON to display a character of "8". A color display in combination of black in a background portion in FC and a selective reflection in a visible range in a segment portion in PL, is provided. In FIG. 5(b), when a character of "5" is newly displayed, upper right and lower left segment portions are lit weakly.

However, when a display is performed in combination of PL and FC in CL-LCD, a PL portion is generally light and the most high visibility is obtainable. Accordingly, in a case of the segment type display in FIG. 5, a possibility of causing erroneous recognition is relatively lower than the case of the dot matrix type in FIG. 4.

The image-sticking phenomenon remains slightly even after a voltage for providing HO has continuously been applied and a state that the entire display area is erased has been continued for several hours. Further, a display state having a image-sticking phenomenon (hereinbelow, referred to as image-sticking) could not be completely erased even after an isotropic state which is caused by heating the liquid crystal has been continued for several hours.

Accordingly, it is an object of the present invention to provide CL-LCD capable of preventing the occurrence of image-sticking even though the liquid crystal is left for a long time while the state of the liquid crystal is constant. Further, the present invention is to provide a liquid crystal optical element having excellent function without changing largely the conventional manufacturing method, and a test method for the liquid crystal optical element.

SUMMARY OF THE INVENTION

According to a first aspect of the present invention, there is provided a liquid crystal optical element comprising a pair of substrates with electrodes between which a liquid crystal layer including a chiral nematic liquid crystal is interposed wherein at least one of the substrates is transparent and the liquid crystal layer exhibits two or more optically stable states in a non-voltage-application time, the liquid crystal optical element being characterized in that a boundary layer is provided between an electrode on at least one of the substrates and the liquid crystal layer, and the surface hardness of the boundary layer is B or less in terms of a pencil hardness test.

In a second aspect, the above-mentioned liquid crystal optical element wherein the boundary layer is a resin layer is provided. In a third aspect, the above-mentioned liquid crystal optical element wherein the resin layer is of polyimide is provided. In a fourth aspects, the above-mentioned liquid crystal optical element wherein the electrode on at least one of the substrates is divided into a plurality of portions is provided. In a fifth aspect, the above-mentioned liquid crystal optical element wherein the surface hardness is 3B or less is provided. In a sixth aspect, the above-mentioned liquid crystal optical element wherein a dot matrix display is performed with the electrodes is provided. In a seventh aspect, the above-mentioned liquid crystal optical element wherein a segment display is performed with the electrodes is provided. In an eighth aspect, the above-mentioned liquid crystal optical element wherein the heat distortion temperature of a material for forming the boundary layer is 50° C. or more, and the coefficient of elasticity at room temperature is 1 kPa or more, is provided.

Further, according to a ninth aspect, there is provided a test method for a liquid crystal optical element comprising a pair of substrates with electrodes between which a liquid crystal layer including a chiral nematic liquid crystal is interposed wherein at least one of the substrates is transparent and the liquid crystal layer exhibits two or more optically stable states in a non-voltage-application time, the test method being characterized in that a boundary layer is provided between an electrode on at least one of the substrates and the liquid crystal layer, and judgment is made as to the presence or absence of a image-sticking phenomenon after the liquid crystal optical element has been left for 1 hour or more in a state of maintaining a predetermined image.

Further, according to a tenth aspect, there is provided a test method for a boundary layer of a liquid crystal optical element comprising a pair of substrates with electrodes between which a liquid crystal layer including a chiral mematic liquid crystal is interposed wherein at least one of the substrates is transparent; the liquid crystal layer exhibits two or more optically stable states in a non-voltage-application time, and a boundary layer is provided at least a part between an electrode on at least one of the substrates and liquid crystal, the test method for a boundary layer of a liquid crystal optical element being characterized in that a test means having a predetermined ranking of hardness is provided; the test means is brought to contact with the boundary layer N times ($1 \leq N$) or more while a pressure is applied to the test means, and evaluation is made as to the surface hardness of the boundary layer based on whether or not a flaw is resulted in the boundary layer, whereby applicability to the liquid crystal layer is determined.

DESCRIPTION OF THE PREFERRED EMBODIMENTS

Figure 1:
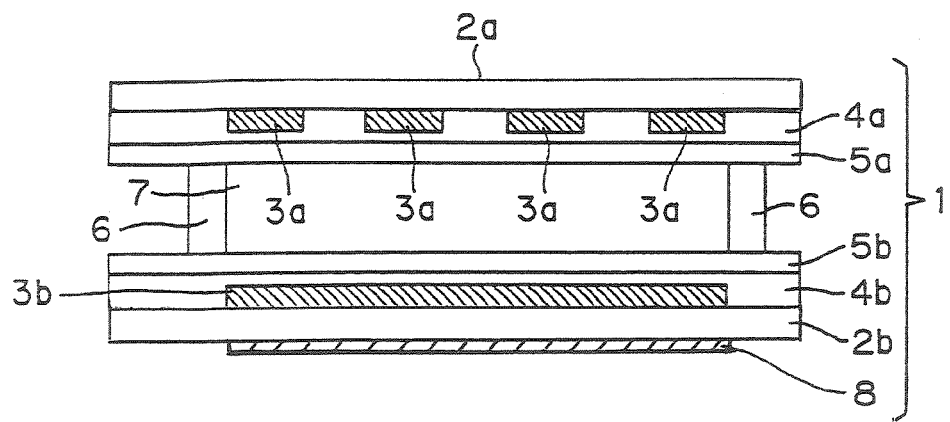
FIG. 1 is a diagrammatic cross-sectional view showing an embodiment of CL-LCD according to the present invention.

It is considered that the image-sticking phenomenon takes place by such effect that the orientation of liquid crystal molecules in a state that the previous phase state is preserved (hereinbelow, referred to as a preservation state) without applying no voltage to the liquid crystal layer, is fixed from a side of the interface. The interface is a region between a boundary layer provided on an electrode and the liquid crystal layer. It is considered that the image-sticking phenomenon takes place by that a state of the liquid crystal molecules at the interface is influenced with a lapse of time in a preservation state.

In the preservation state, there is a case that the orientation of liquid crystal in an inner portion is changed so as to have a stable orientation because the orientation is fixed in a long time. When the surface hardness of the boundary layer to which the liquid crystal contacts is high (high hardness), the orientation of the liquid crystal molecules at the interface changes inelastically. When the preservation state is canceled and the orientation of the liquid crystal is changed to have a different state, a history remains in the orientation of the liquid crystal at the interface. Accordingly, the orientation of the liquid crystal in the preservation state may influence liquid crystal in the vicinity of the interface.

On the contrary, in the boundary layer in contact with the liquid crystal layer, when the heat distortion temperature is less than 50° C.; the coefficient of elasticity at room temperature is less than 1 kPa and the boundary layer is very soft and has a high fluidity, the boundary layer may be deformed with a change in a state of the orientation of the liquid crystal layer at a high temperature. Then, there causes a problem that the boundary layer does not return to the original state, and the display changes.

On the other hand, when the boundary layer in contact with the liquid crystal layer has a low hardness and is relatively soft, liquid crystal molecules in the vicinity of the interface can behave elastically. Namely, even though the orientation of the liquid crystal in the vicinity of the interface is able to be changed by suffering influence from the orientation of the liquid crystal in an inner portion to have a stable alignment in the preservation state, the liquid crystal in the vicinity of the interface can return to the original state of orientation, as if an elastic deformation is restored, by applying a voltage to change the orientation of the liquid crystal in an inner portion. Accordingly, there is no possibility that the orientation of the liquid crystal in the vicinity of the interface in the preservation state is fixed.

In other words, when the liquid crystal molecules are controlled by applying a voltage from an outer side, and a display is performed by utilizing a memory state by canceling the voltage, it is preferable that the liquid crystal in an inner portion of the bulk of the liquid crystal layer and in the region of the interface can behave in substantially same manner. It is preferable that physical properties of the boundary layer are determined in consideration of the liquid crystal used.

For this purpose, a material having a low elasticity and being relatively soft is used for the boundary layer in contact with the liquid crystal, whereby image-sticking in CL-LCD can be prevented. Further, as such boundary layer, a resin layer having a surface hardness of "B" or less in a pencil hardness test method is used. As a polymer material used for the boundary layer, a material having durability to liquid crystal, temperature stability, easiness in manufacturing and a surface hardness having a predetermined softness may be used. It is preferable that an aligning treatment by rubbing is not used to the surface of the resin layer. The following test method can be employed to measure the surface hardness.

Test tools of Q kinds of hardness ranking each having different hardness are prepared. Two or more test tools which are consecutive in hardness ranking are selected. They are brought to contact with the boundary layer in contact with the liquid crystal layer N times ($1 \leq N$) or more respectively while a pressure is applied, and a difference of flaws resulted in the boundary layer is observed. When a significant difference is observed, surface hardness is determined. When the number of times of the occurrence of flaws per N times is K times ($1 \leq K \leq N$), the boundary layer satisfying the following conditions is found. Further, the test method may be simplified, and a predetermined standard is previously determined. Namely, judgment of 0/1 can be conducted in the detection of once time. This method can be applied to a sampling inspection in a production process.

In a case of N=1 or 2,
(1) K=0 on the M th test tool and
(2) $1 \leq K$ on the M+1 th test tool
In a case of N=3 or more,
(3) K/N<0.4 on the M th test tool and
(4) $0.4 \leq K/N$ on the M+1 th test tool.

In the following, CL-LCD of the present invention will be described with reference to the drawings. FIG. 1 shows a cross-sectional view of an embodiment of CL-LCD. A first substrate 2a is arranged at a front side and a second substrate 2b is arranged at a rear side wherein at least a part of the substrate 2a is transparent. The substrate 2b may be opaque. Glass or plastics may be used for the substrates. A black coating or a colored layer which absorbs or reflects partly visible light is arranged as a light absorbing layer 8 on an outer surface of the substrate 2b at a rear side. Further, a color filter may be provided at an inner surface side of the substrate to adjust visibility and so on.

In the following, a case that the substrates 2a, 2b are both transparent will be described. A transparent electrode group 3a is arranged at a front side and a transparent electrode group 3b is arranged at a rear side so as to cross perpendicularly. Either is determined to be a row electrode group; the other is to be a column electrode group, and each crossing portion of the row electrode group and the column electrode group is to be each pixel. The light absorbing layer 8 is provided at the rear surface side so as to correspond to a display portion. Further, an electrical insulation layer 4a is formed on the transparent electrode group 3a, and a resin layer 5a which is not subjected to an alignment treatment by rubbing is formed on the electrical insulation layer 4a. The surface hardness of the resin layer 5a is determined to be "B" or less in a test value according to a pencil hardness test which will be described later.

For example, the resin layer 5a may be formed by using a polyimide resin. In this case, it is preferable that a state of the baked surface is used as it is. The resin layer may be formed on either one of the substrates 2a, 2b. However, it is preferable to form the resin layer 5b at a rear surface side in the same manner as at a display surface side.

The substrates 2a, 2b are pressed by interposing a peripheral sealing material 6 to form a cell gap into which a chiral nematic liquid crystal layer 7 is introduced. The liquid crystal is driven by a voltage applied across the electrodes so that transition in a phase state is controlled.

Next, a test method for the boundary layer according to the present invention will be described. First, a test piece was prepared to test the surface hardness, and tests were conducted with testing pencils and a pencil-scratching tester. The test method is based on in principle JIS K 5400 8.4 (Japanese Industrial Standard defining the surface properties of coating or the like. There is ASTM D-3363, U.S.A. as a similar test method/standard). The method for forming a coating on the test piece and the length on the test piece scratched with pencils were according to different procedures from JIS K 5400. The procedures are described specifically.

On a glass substrate having a size of 10 cm×10 cm and a thickness of 0.7 mm, a solution of resin was coated by screen printing. It was baked at 300° C. for 30 min to form a resin layer having a thickness of about 600 Å. As the test piece, such one that the resin layer was formed, and then, it was left one day or more, was used. The test piece forming procedures are different from those of JIS K 5400.

Testing pencils as described in JIS S 6006 are used. As the testing pencils, there are those in a set having a series of density signs proposed by Japan Paint Inspection and testing Association. In the hardness of pencils, a density sign of 9H is the hardest and 6B is the softest. A harder one has an upper ranking. In the measurement, the core of a testing pencil is exposed to about 3 mm in a circular column shape by using a cutting knife. Then, the core is put on a polishing paper perpendicularly, and it is polished so that the top end is flat and the angle is acute. As the polishing paper, the polishing paper of No. 400 described in JIS R 6252 is used.

Figure 2:
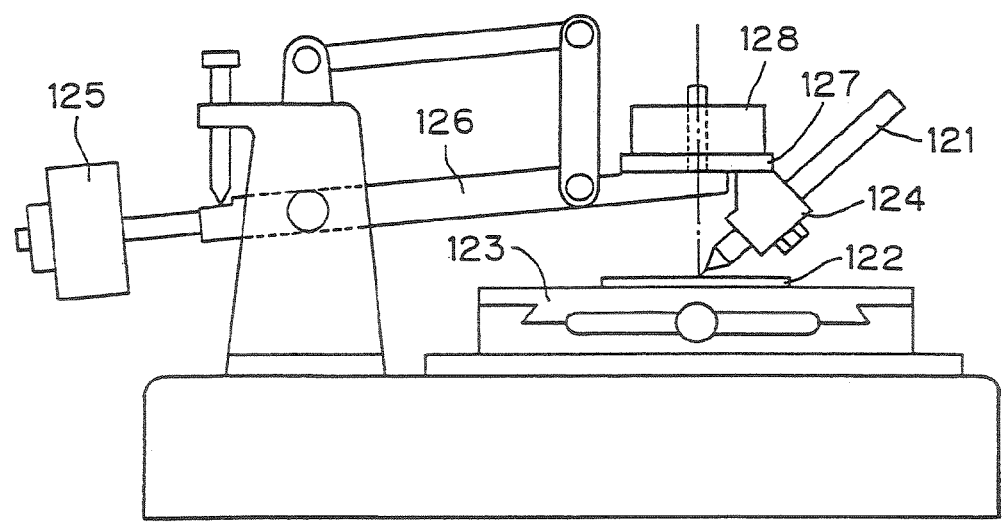
FIG. 2 is a diagram showing a pencil-scratching tester.

As the test method, a scratching method by a human hand was not employed but a method by a tester was employed. As the tester, a surface property measuring instrument of TYPE-HEIDON: 14 (hereinbelow, referred to as measuring instrument) manufactured by Shinto Kagakusha was used. FIG. 2 shows a state that a test piece and a pencil are attached to the measuring instrument. In measuring the hardness of a resin layer, a test piece 122 is attached to a test piece mounting table 123 of the measuring instrument. In this case, the test piece is fixed horizontally with an adhesive tape directing the coated surface upward.

Figure 3:
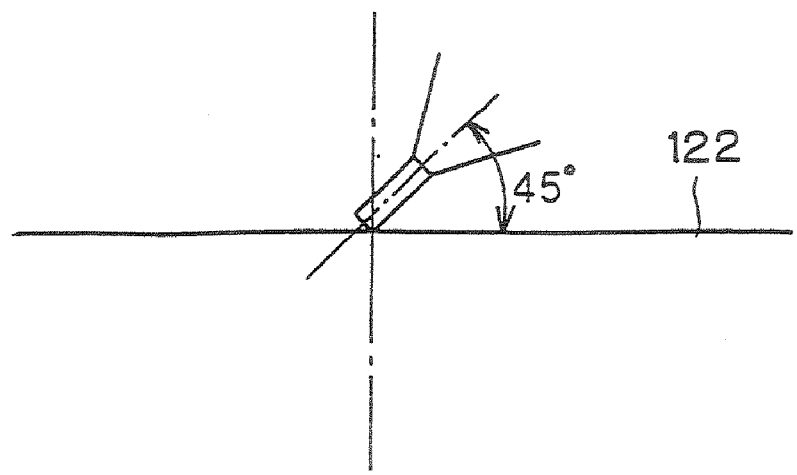
FIG. 3 is an explanatory diagram showing a pencil in contact with a test piece.
Figure 4:
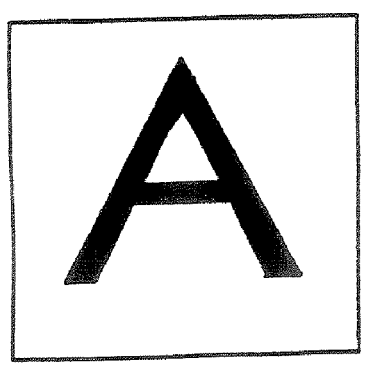
FIG. 4(a) is an explanatory diagram showing a correct display of a character of "A"
FIG. 4(b) is an explanatory diagram showing a state of image-sticking.
Figure 4:
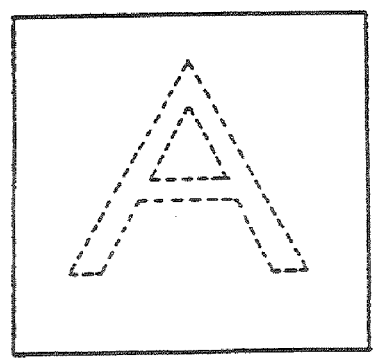
Figure 5:
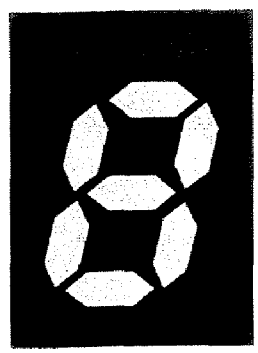
FIG. 5(a) is a diagram showing a correct display of a character of "8" in a segment type CL-LCD.
FIG. 5(b) is a diagram showing a state of image-sticking phenomenon.
Figure 5:
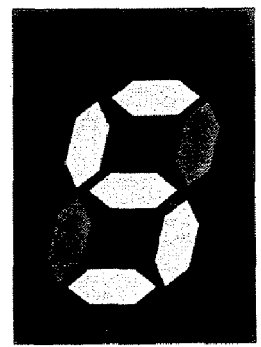

The test piece 122 should be fixed to the test piece mounting table 123 so as not to move in a direction of the movement of the table. Subsequently, a testing pencil 121 is selected, and it is attached to a pencil holder 124 so that the top end of the core of the pencil is brought to contact with the coated surface (the resin layer). FIG. 3 shows a state that the core of the pencil having a flat top end and an acute edge is in contact with the coated surface at an angle of 45° C.

Then, a balance weight 125 is adjusted so that the load of the pencil 121 applied to the test piece 122 is not deflected in a positive or negative side. The pencil 121 is separated from the coated surface; a lever 126 is fixed, and a weight 128 having 1.0 kg is placed on a weight table 127 so that the pencil 121 is again brought to contact with the coated surface, and the load of the weight 128 is applied to the top end of the core.

In this state, the pencil mounting table 123 is moved at a constant speed of 0.5 mm/s. In the measuring instrument, the test piece mounting table 123 is moved by driving a motor. By such movement, the coated surface of the test piece 122 is scratched in a length of about 10 mm with the core of the pencil 122. Thus, a test of one time is finished. After the test of one time, the core of the pencil 121 is again polished, and the same test is conducted. 5 Times of test are conducted to one pencil.

The procedures of measurement was principally based on JIS K 5400 as described above provided that the length of scratching the test piece with the pencils was determined to be about 10 mm. Although the length of scratching is 3 mm in JIS K 5400, the length was determined to be long in order to obtain easy confirmation of the presence or absence of a flaw in the resin layer. Basically, the same effect is obtainable in the case of 3 mm.

After 5 times of test were conducted on the one pencil, a pencil having the next density sign was selected to conduct 5 times of test similarly. These tests are conducted successively on pencils of different density sign.

A pair of pencils whose density signs are adjacent to each other in which there is a pencil wherein a "drag mark" is recognized 2 times or more among 5 times of test, and a pencil wherein the drag mark is recognized less than 2 times, are selected. In the selected pair of pencils, the density sign on the pencil wherein the occurrence of the "drag mark" is less than 2 times is determined to be the surface hardness of the resin layer. Namely, a group of pencils of 17 grades: 6B, 5B, 4B, 3B, 2B, B, HB, F, H, 2H, 3H, 4H, 5H, 6H, 7H, 8H and 9H, is prepared. Then, the density sign of a pencil having the hardness at a lower side, selected from this pencil group, wherein the occurrence of drag marks is less than 2 times among 5 times when a test piece is scratched each 5 times with two pencils having adjacent grades of density sign, is adopted. Accordingly, in the pencil having a higher hardness ranking by 1 grade, the occurrence of the drag mark is 2 times or more among 5 times.

Here, the "drag mark" means a flaw which slightly bites in the surface of the coated layer, and excludes a concave in the coated layer resulted from the application of a pressure. A distinguishable flaw under the following conditions is defined as "drag mark". Carbon powder is removed with an erasing rubber so as not to damage the coated layer in the tested portions, and visual observation is conducted from a direction perpendicular to the direction of scratching and from an angle of 45° to the test plane. As the erasing rubber, a plastic erasing rubber described in JIS S 6050 is used.

Next, a method for manufacturing a liquid crystal optical element 1 will be described. First, two substrates with transparent conductive layers such as ITO (indium tin oxide) were prepared. To each substrate, an electrode group having predetermined interline spaces (spaces between electrodes) and a predetermined number of electrodes were formed by etching, and an electrical insulation layer was formed at a side of the transparent electrode forming surface of each of the substrates.

Then, a solution of polyimide resin was coated on the electrical insulation layer of each of the substrates by a spin coating method; the solvent was dried at 60° C., and it is baked at 300° C. for 30 min. By such treatment, a resin layer having a layer thickness of about 600 Å was formed.

Then, spacers of resin beads having a diameter of 4 μm were scattered on the substrates, and a peripheral sealing material made of an epoxy resin including a slight amount of glass fibers having a diameter of 4 μm was coated at 4 sides of the substrates excluding a portion as a liquid crystal injection port. Then, the two substrates were bonded to thereby prepare a liquid crystal cell.

As a chiral nematic liquid crystal, 5.1 parts of chiral agent indicated by chemical 1, 5.1 parts of chiral agent indicated by chemical 2 and 5.1 parts of chiral agent indicated by chemical 3 were mixed to 84.7 parts of nematic liquid crystal having $T_c=87°$ C., $\Delta n=0.231$, $\Delta \epsilon=16.5$, viscosity $\eta=32$ mPa·s and relative resistivity=$2\times10^{11}$ Ω·cm. Thus prepared chiral nematic liquid crystal is referred to as liquid crystal P. The helical pitch of the liquid crystal P was about 0.34 μm.

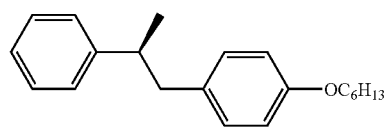

(Chemical 1)

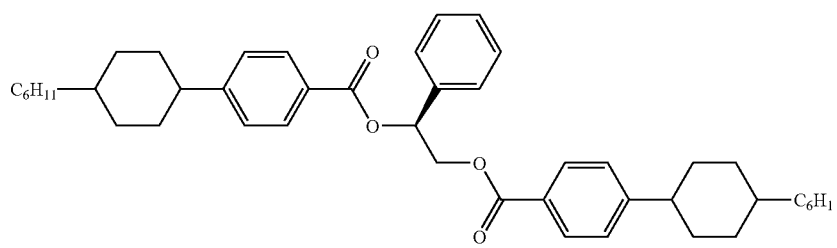

(Chemical 2)

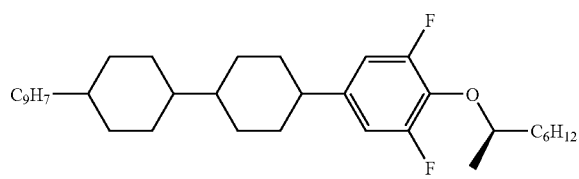

(Chemical 3)

After the liquid crystal P was injected to the liquid crystal cell by a vacuum injection method, the injection port was sealed with a photocurable resin. The injected liquid crystal P was directly on the resin layers. In this case, the surface hardness of the resin layers was determined to be "B" or less in terms of pencil hardness. Further, a black paint was coated on an outer surface of a rear side substrate in the liquid crystal cell. Hereinbelow, Examples and Comparative Examples will be described.

EXAMPLE 1

CL-LCD was prepared according to the manufacturing method described before. The line space was 10 μm and the number of stripe electrodes was 4. Each resin layer as a boundary layer was formed by using a solution of polyimide resin RN-1266 manufactured by Nissan Chemical Industries, Ltd. wherein the layer thickness was about 600 Å. In the measurement of the surface hardness of the resin layer according to the before-mentioned test method, it was found to be "B". RN-1266 and RN-1286 which is used in Example 2 are a new material for an alignment layer, and the properties and so on are described in specifications provided by that company.

Then, a bipolar pulse of rectangular waveform (hereinbelow, referred to as a pulse A) having a pulse width of 900 ms and an effective value of 20 Vrms was applied to all pixels through electrodes of both substrate. Then, liquid crystal P became FC, and all the pixels exhibited a uniform black color. Then, a bipolar pulse of rectangular waveform (hereinbelow, referred to as a pulse B) having a pulse width of 100 ms and an effective value of 40 Vrms was applied by selecting electrode lines of the both substrates. The liquid crystal P at pixels to which the voltage was applied, became PL, and the pixels exhibited a selective reflection of green color.

As described above, a state that a portion exhibiting a selective reflection of green color and a portion exhibiting a black color were mixed in the same display surface, was provided. After the liquid crystal optical element was put in a constant temperature of 60° C. for 10 days, it was again taken out in an atmosphere of room temperature. The state of display at the time of taking out from the incubator was the same as that before putting into the incubator.

Next, the pulse A and the pulse B were alternately applied 3 times to all the pixels by selecting all electrode lines. When voltages were applied and stopped in the order of pulse A, pulse B, pulse A, each pixels exhibited a uniform black color (FC) having no difference of brightness. Further, when voltages were applied and stopped in the order of pulse B, pulse A, pulse B, each pixel exhibited a uniform selective reflection of green color (PL). Thereafter, even when the application of the pulse A or the pulse B was repeated several times, a uniform green color or black color having no difference of brightness was exhibited between pixels. As described above, in CL-LCD using the resin layers having a pencil hardness "B" or less, the occurrence of image-sticking could be suppressed.

EXAMPLE 2

A liquid crystal optical element was prepared by the same method as in Example 1 except that a solution of polyimide resin RN-1286 manufactured by Nissan Chemical Industries, Ltd. was used. The line space was 10 μm and the number of stripe electrodes was 160. The surface hardness of the resin layers was "3B".

First, initialization was performed by applying a relatively high voltage to liquid crystal corresponding to each pixel to render the liquid crystal to be HO; by eliminating the voltage in such state, and applying further a voltage which rendered the liquid crystal to be FC. After the initialization, a-line-at-a-time driving was performed in one round with 160 row electrodes and 160 column electrodes to display a character of "A", and then, the application of the voltage was stopped. As a result, a state that a character of "A" in a green color (PL) was displayed in a background of black color (FC), was provided. After the liquid crystal panel displaying a character of "A" was preserved in a incubator of 60° C. for about 1000 hours, it was again taken out in an atmosphere of room temperature. The state of display at the time of taking out from the incubator was the same as that before putting into the incubator.

Next, the liquid crystal to all the pixels was made to be FC by the same driving method as used for displaying a character of "A" before the preservation whereby a black image was provided in the entire display. Further, the liquid crystal to all the pixels was made to be PL as well, whereby the entire display became a state exhibiting a selective reflection of green color. Further, the liquid crystal to all the pixels was again to be FC, whereby the entire display provides a black display, and then, the application of the voltage was stopped. In this case, there was no difference of brightness between pixels, and the entire display exhibited a uniform black color. Thereafter, even when an attempt of providing a state of black display or a state of selective reflection was made several times, a uniform image having no difference of brightens could be obtained between pixels. In this Example too, the occurrence of image-sticking could be inhibited by using resin layers having a pencil hardness of "B" or less.

COMPARATIVE EXAMPLE A1

A liquid crystal optical element was prepared by the same method as in Example 1 except that a solution of polyimide resin SE-3840 manufactured by Nissan Chemical Industries, Ltd. was used as resin layers. The surface hardness of the resin layers in this example was "3H".

In the same manner as in Example 1, a state of that a portion exhibiting a selective reflection of green color and a portion exhibiting a black color were mixed in the same panel, was provided. The panel was put in a incubator of 60° C. for 10 days. Then, it was again taken out in a atmosphere of room temperature. The state of display was the same as that before putting into the incubator.

Next, the pulse A and the pulse B were alternately applied 4 times or more to all the pixels by selecting the all electrodes. when the pulse A and the pulse B were alternately applied in the order of pulse A, pulse B, pulse A, . . . , it was found that there was a difference of brightness between pixels and a uniform image could not be provided in the entire display even in a case that the entire display was in a black color, or a case that the entire display was in a green color (selective reflection). The difference of brightness took place between pixels which displayed a black color and pixels providing the selective reflection before the preservation in the incubator.

Even when voltages were applied in the order of pulse B, pulse A, pulse B, . . . after the panel was taken out from the incubator, the entire display did not provide a uniform image. Further, after a lapse of 5 days, there was no change in the state of display. Thus, image-sticking took place in the case that the surface hardness of the resin layers in contact with the liquid crystal P was "3H".

COMPARATIVE EXAMPLES A2, A3 and A4

Liquid crystal optical elements were prepared in the same manner as in Example 2 provided that the kind of a solution of resin used for forming resin layers was changed. The solution of resin by CHISSO CORPORATION is for conventional TN or STN. In Comparative Example A4, no alignment layer was formed. Then, a character of "A" was displayed by the same driving method as in Example 2, and then, the application of the voltage was stopped. The liquid crystal in a background portion exhibited a black color (FC), and the liquid crystal in a portion corresponding to a character of "A" exhibited a green color (PL). After the liquid crystal panel was preserved in a incubator of 60° C. for about 1000 hours, it was again taken out in an atmosphere of room temperature.

The entire display was made to be a black image by the same driving method as used for displaying "A" before the preservation in the same manner as Example 2. Further, the liquid crystal to the entire pixels was made to be PL, and the entire display was to be a state of selective reflection of green color. Further, the liquid crystal to the entire pixels was again to be FC, whereby the entire display provided a black image, and then, the application of the voltage was stopped.

Then, a degree of recognition of a image of "A" after a long time preservation, namely, a degree of the occurrence of image-sticking was examined for each solution of resin used. Further, the surface hardness of the resin layers by each of the solution of resin was measured by the before-mentioned method. Table 1 shows the surface hardness of the resin layers and a degree of image-sticking in each Example. In Table 1, "○" indicates a state that the character of "A" can not be observed at all, "X" indicates a state capable of being recognized, and "Xx" indicates a state that it can be recognized strongly. Further, even after a lapse of 5 days, there was no change in the degree of image-sticking in each of the liquid crystal panels.

TABLE 1

| Example | Kind of solution of resin (Product code and producer) | | Surface hardness | Degree of image-sticking |
|---|---|---|---|---|
| 1 | RN-1266 | Nissan Chemical Industries, Ltd. | B | ○ |
| 2 | RN-1286 | Nissan Chemical Industries, Ltd. | 3B | ○ |
| A1 | SE-3840 | Nissan Chemical Industries, Ltd. | 3H | X |
| A2 | A-2504 | CHISSO CORPORATION | 3H | X |
| A3 | A-2710 | CHISSO CORPORATION | 3H | X |
| A4 | (Nil) | Only ITO | >6H | XX |

As shown in Table 1, image-sticking takes place when the surface hardness of the resin layers is "3H" or the like. However, no image-sticking takes place when the surface hardness is relatively low as "B" or "3B".

In the above-mentioned Examples 1 and 2, the surface hardness of the boundary layers were respectively "B" and "3B". The resin layers having a surface hardness within "B" to "3B" can be forced by adjusting a relative amount of the solution of resin used in each Example and mixing it.

Further, instead of polyimide, a predetermined compound may be selected from a polymer material in consideration of the durability to liquid crystal, the temperature properties long time stability, easiness in forming the resin layers and so on.

In each of the above-mentioned Examples, a case that a resin layer is provided between the entire surface of the transparent electrode and the liquid crystal layer is shown. Even in a case that the resin layer is provided between a part of the transparent electrode and the liquid crystal layer, image-sticking can be prevented in a range where the resin layer is provided.

Since it is considered that the image-sticking takes place by that the orientation of liquid crystal in a state of preservation affects liquid crystal molecules fixed at the interface, it is preferable that the resin layer having a lower hardness is directly on the liquid crystal.

The liquid crystal optical element shown in each of the above-mentioned Examples has such structure that two substrates have respectively a plurality of electrodes. However, a structure that either of the substrates has an electrode which is divided into a plurality of portions and the other has a non-divided common electrode (a sheet-like electrode) may be used.

In the test method of the present invention, a state of standing means that a state of display is maintained as it is in a predetermined atmosphere without applying a driving voltage. In this case, inspection for image-sticking can be conducted in a shorter time than the before-mentioned Examples by adjusting external circumstances such as temperature. For example, in conducting sampling inspection for each lot or a periodical inspection of evaluating process in mass production, a result can be obtained preferably in a short cycle.

Further, the present invention is applicable not only to a liquid crystal display element for performing dot matrix driving but also a liquid crystal optical element for performing segment display type and static driving. Further, in the liquid crystal optical element in the present invention, the liquid crystal may be a cholesteric liquid crystal.

In accordance with the present invention, the occurrence of image-sticking can be prevented by providing a resin layer having a surface hardness of B or less in a pencil hardness test method, between a part of or the entire surface of the electrode of at least one substrate and the liquid crystal.

Further, the liquid crystal optical element of the present invention can be used for a public information display apparatus, a display device for a portable equipment, a display device for an equipment of measurement, a display device for a private electronic equipment and so on. Further, a display of high quality having a memory effect can be provided.

What is claimed as new and is desired to be secured by Letters Patent of the United States is:

1. A liquid crystal optical element, comprising:
   a pair of substrates with electrodes between which a liquid crystal layer comprising a chiral nematic liquid crystal is interposed;
   wherein at least one of the substrates is transparent;
   wherein the liquid crystal layer exhibits two or more optically stable states containing a planar state and a focal conic state in a non-voltage-application time;
   wherein the liquid crystal optical element, which produces a selective reflection, comprises a boundary layer comprising polyimide which is provided between an electrode on at least one of the substrates and the liquid crystal layer; and wherein the surface hardness of the boundary layer is B or less in terms of a pencil hardness test.

2. The liquid crystal optical element according to claim 1, wherein the electrode on at least one of the substrates is divided into a plurality of portions.

3. The liquid crystal optical element according to claim 1, wherein the surface hardness is 3 B or less.

4. The liquid crystal optical element according to claim 1, wherein a dot matrix display is performed with the electrodes.

5. The liquid crystal optical element according to claim 1, wherein a segment display is performed with the electrodes.

6. A test method for a liquid crystal optical element, comprising:

judging the presence or absence of a image-sticking phenomenon after the liquid crystal optical element has been left for 1 hour or more in a state of maintaining a predetermined image;

wherein said liquid crystal optical element is as claimed in claim 1.

7. A test method for a boundary layer of a liquid crystal optical element, comprising:

providing a test means having a predetermined ranking of hardness;

contacting the test means with a boundary layer of said liquid crystal optical element N times ($1 \leqq N$) or more while a pressure is applied to the test means evaluating the surface hardness of the boundary layer based on whether or not a flaw has resulted in the boundary layer, thereby determining applicability to a liquid crystal layer of said liquid crystal optical element;

wherein said liquid crystal optical element is as claimed in claim 1.

8. A public information display apparatus, comprising the liquid crystal optical element as claimed in claim 1.

* * * * *